(12) United States Patent
Ouchi et al.

(10) Patent No.: US 10,228,557 B2
(45) Date of Patent: Mar. 12, 2019

(54) IMAGE READING DEVICE AND IMAGE FORMING APPARATUS THEREWITH

(71) Applicant: KYOCERA Document Solutions Inc., Osaka (JP)

(72) Inventors: Kei Ouchi, Osaka (JP); Takaaki Murase, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 15/826,123

(22) Filed: Nov. 29, 2017

(65) Prior Publication Data

US 2018/0149861 A1    May 31, 2018

(30) Foreign Application Priority Data

Nov. 30, 2016  (JP) ................. 2016-233044

(51) Int. Cl.
| | |
|---|---|
| *H04N 1/04* | (2006.01) |
| *G02B 27/00* | (2006.01) |
| *G02B 17/02* | (2006.01) |
| *H04N 1/00* | (2006.01) |
| *H04N 1/193* | (2006.01) |
| *H04N 1/40* | (2006.01) |
| *G02B 17/00* | (2006.01) |
| *H04N 1/387* | (2006.01) |

(52) U.S. Cl.
CPC ....... *G02B 27/0025* (2013.01); *G02B 17/002* (2013.01); *G02B 17/023* (2013.01); *H04N 1/00519* (2013.01); *H04N 1/1937* (2013.01); *H04N 1/3876* (2013.01); *H04N 1/40056* (2013.01)

(58) Field of Classification Search
CPC .............. G02B 27/0025; G02B 17/002; G02B 17/023; H04N 1/00519; H04N 1/1937; H04N 1/3876; H04N 1/40056
USPC ................................ 358/475, 482, 483, 461
See application file for complete search history.

(56) References Cited

U.S. PATENT DOCUMENTS

| | | | |
|---|---|---|---|
| 8,345,325 B2 | 1/2013 | Schmidt et al. ............... 358/475 |
| 2003/0095335 A1 | 5/2003 | Ogi .............................. 359/652 |
| 2011/0249304 A1* | 10/2011 | Kaise ................. H04N 1/02825 |
| | | | 358/474 |

(Continued)

FOREIGN PATENT DOCUMENTS

JP    2003-121608 A    4/2003

*Primary Examiner* — Cheukfan Lee
(74) *Attorney, Agent, or Firm* — Stein IP, LLC

(57) ABSTRACT

An image reading device has a reading module including a light source, an optical system having a mirror array where reflection mirrors are coupled together in the main scanning direction and an aperture stop portion, a sensor where imaging regions for converting the image light imaged by the optical system into an electrical signal are arranged, and a housing, and has a reference drawing pattern determining connection positions between the imaging regions. The reference drawing pattern is composed of a plurality of pixel cut lines arranged to correspond to boundary lines between the reflection mirrors. The optical system is fixed on the housing at one point in the main scanning direction, and the pixel cut lines are arranged such that their distances from the boundary lines in the main scanning direction increase the farther away from the fixed position of the optical system in the main scanning direction.

9 Claims, 6 Drawing Sheets

(56) References Cited

U.S. PATENT DOCUMENTS

| | | | |
|---|---|---|---|
| 2018/0035001 A1* | 2/2018 | Murase | H04N 1/02835 |
| 2018/0035002 A1* | 2/2018 | Murase | H04N 1/02835 |
| 2018/0149861 A1* | 5/2018 | Ouchi | G02B 27/0025 |
| 2018/0152580 A1* | 5/2018 | Murase | H04N 1/02885 |
| 2018/0152581 A1* | 5/2018 | Murase | H04N 1/0306 |

\* cited by examiner

IMAGE READING DEVICE AND IMAGE FORMING APPARATUS THEREWITH

INCORPORATION BY REFERENCE

This application is based upon and claims the benefit of priority from the corresponding Japanese Patent Application No. 2016-233044 filed on Nov. 30, 2016, the entire contents of which are incorporated herein by reference.

BACKGROUND

The present disclosure relates to an image reading device and an image forming apparatus provided with a reading module that is incorporated in digital copiers, image scanners, and the like and that reads reflected image light of the light radiated to a document.

Conventional optical imaging systems for image reading devices incorporated in multifunction peripherals and the like adopting an electro-photographic process include a reduction optical system where images are formed on a reduced scale and a unity magnification optical system where images are formed at unity magnification without being reduced.

In the reduction optical system, a reduced image is formed on an image sensor whose size is smaller than that of a document by use of a plurality of plane mirrors and an optical lens, and then the image is read. In the reduction optical system, as an image sensor, a charge-coupled device called a CCD sensor is used. The reduction optical system advantageously has a deep depth of field. Here, the depth of field is the range in which, even when a subject (here a document) is displaced in the direction of the optical axis from the in-focus position, the subject can be seen as if in focus. This means that, with a deep depth of field, even when the document is displaced from the predetermined position, it is possible to obtain a satisfactory image.

On the other hand, the reduction optical system inconveniently has a very large optical path length (the distance light travels from a subject to the sensor) of 200 to 500 mm. In image reading devices, for the purpose of securing the optical path length in a limited space in a carriage, the direction in which light travels is changed by use of a plurality of plane mirrors. This increases the number of components required, leading to an increased cost. When a lens is used in the optical system, chromatic aberration occurs due to variation in the refractive index with wavelength. To correct the chromatic aberration, a plurality of lenses is required. As will be seen from the above, using a plurality of lenses becomes one of the factors that increase the cost.

In the unity magnification optical system, an image is read by being imaged, with a plurality of erect-image rod-lenses with unity magnification arranged in an array, on an image sensor whose size is similar to that of a document. In the unity magnification optical system, as an image sensor, a photoelectric conversion device called CMOS (complementary MOS) sensor is used. The unity magnification optical system advantageously has the following advantages. A smaller optical path length of 10 to 20 mm compared with the reduction optical system helps achieve compactness. Imaging by use of rod lenses alone eliminates the need for mirrors required in the reduction optical system. This helps make a scanner unit that incorporates a unity magnification optical system sensor slim. The simple construction helps achieve cost reduction. On the other hand, the unity magnification optical system has a very small depth of field, and thus when a document is displaced in the direction of the optical axis from a predetermined position, a severe blur results from image bleeding due to different magnifications of the individual lenses. As a result, it is inconveniently impossible to uniformly read a book document or a document with an uneven surface.

In recent years, a method has been proposed in which, instead of the reduction optical system or the unity magnification optical system described above, an image is read by use of a reflection mirror array in the imaging optical system. In this method, a plurality of reflection mirrors are arranged in an array, and a document read in different reading regions corresponding to the reflection mirrors on a region-by-region basis is formed into an inverted image on a reduced scale on a sensor. Unlike in the unity magnification optical system that uses a rod-lens array, one region is read and imaged with one optical system. By adopting the telecentric optical system as the imaging system, when a document is read on a region-to region basis, no image bleeding occurs as a result of images with different magnifications overlapping with each other; it is thus possible to suppress image blurring and achieve a compound-eye reading method.

In this method, the optical system uses mirrors alone, and thus unlike in a case where the optical system uses a lens, no chromatic aberration occurs. This makes it unnecessary to correct chromatic aberration, and thus helps reduce the number of elements constituting the optical system.

SUMMARY

According to one aspect of the present disclosure, an image reading device includes a reading module and a reference drawing pattern. The reading module includes a light source, an optical system, a sensor, and a housing. The light source radiates light to a document. The optical system images, as image light, reflected light of the light radiated from the light source to the document. In the sensor, a plurality of imaging regions for converting the image light imaged by the optical system into an electrical signal are arranged next to each other in the main scanning direction. The housing houses the light source, the optical system, and the sensor. The optical system includes a mirror array and a plurality of aperture stop portions. In the mirror array, a plurality of reflection mirrors whose reflection surfaces are aspherical concave surfaces are coupled together in an array in the main scanning direction. The aperture stop portions are each arranged in an optical path of image light between a reflection mirror and an imaging region of the sensor, and adjust the amount of image light reflected from the reflection mirror. The reference drawing pattern determines connection positions between the imaging regions at which to connect together images imaged in the imaging regions. The reference drawing pattern is composed of a plurality of pixel cut lines arranged to correspond to boundary lines between the reflection mirrors. The optical system is fixed on the housing at one point in the main scanning direction. The pixel cut lines are arranged such that their distances from the boundary lines in the main scanning direction increase the farther away from the fixed position of the optical system in the main scanning direction.

Further features and advantages of the present disclosure will become apparent from the description of embodiments given below.

DETAILED DESCRIPTION

Figure 1:
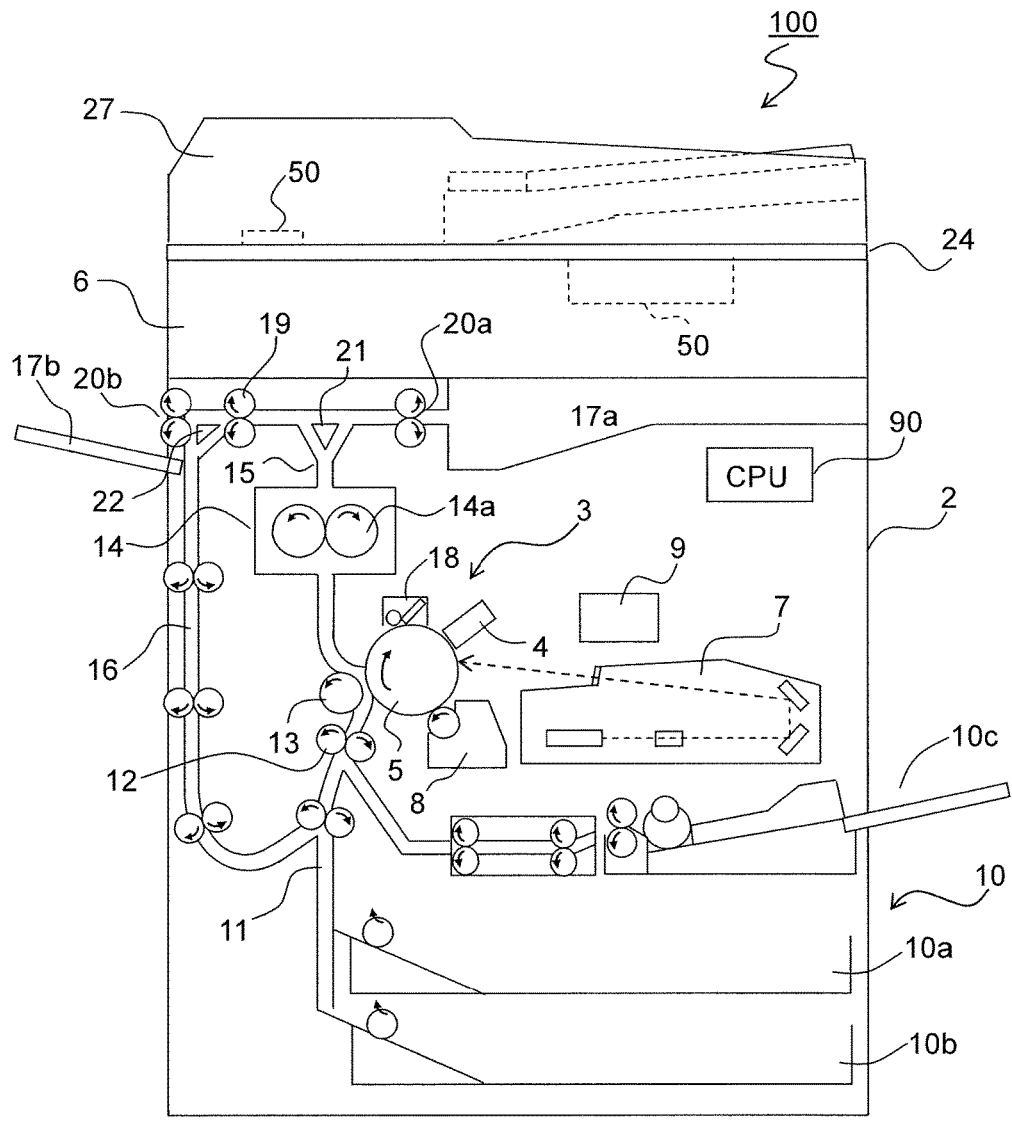
FIG. 1 is a side sectional view showing the overall construction of an image forming apparatus incorporating an image reading portion according to the present disclosure.

Hereinafter, embodiments of the present disclosure will be described with reference to the accompanying drawings. FIG. 1 is a diagram showing an outline of the construction of an image forming apparatus 100 incorporating an image reading portion 6 according to the present disclosure. In the image forming apparatus 100 shown in FIG. 1 (here a digital multifunction peripheral is taken as an example), a copy operation proceeds as follows. In the image reading portion 6, which will be described later, document image data is read and is converted into an image signal. On the other hand, in an image forming portion 3 in a multifunction peripheral main body 2, a photosensitive drum 5 that rotates in the clockwise direction in FIG. 1 is electrostatically charged uniformly by a charging unit 4. Then, by a laser beam from an exposure unit (such as a laser scanner unit) 7, an electrostatic latent image is formed on the photosensitive drum 5 based on the document image data read in the image reading portion 6. Then, developer (hereinafter, referred to as toner) is attached to the formed electrostatic latent image by a developing unit 8, and thereby a toner image is formed. Toner is fed to the developing unit 8 from a toner container 9.

Toward the photosensitive drum 5 having the toner image formed on it as described above, a sheet is conveyed from a sheet feeding mechanism 10 via a sheet conveyance passage 11 and a registration roller pair 12 to the image forming portion 3. The sheet feeding mechanism 10 includes sheet feed cassettes 10a and 10b and a stack bypass (manual feed tray) 10c arranged over the sheet feed cassettes 10a and 10b. When the conveyed sheet passes through a nip between the photosensitive drum 5 and a transfer roller 13 (image transfer portion), the toner image on the surface of the photosensitive drum 5 is transferred to the sheet. Then, the sheet having the toner image transferred to it is separated from the photosensitive drum 5, and is conveyed to a fixing portion 14, which has a fixing roller pair 14a, so that the toner image is fixed there. The sheet having passed through the fixing portion 14 is distributed among different conveyance directions by passage switching mechanisms 21 and 22 arranged at branch points in a sheet conveyance passage 15. The sheet is then, as it is (or after being conveyed to a reverse conveyance passage 16 and being subjected to two-sided copying), discharged onto a sheet discharge portion composed of a first discharge tray 17a and a second discharge tray 17b.

After toner image transfer, toner left unused on the surface of the photosensitive drum 5 is removed by a cleaning device 18. Electric charge remaining on the surface of the photosensitive drum 5 is removed by a destaticizer (unillustrated) arranged on the downstream side of the cleaning device 18 in the rotation direction of the photosensitive drum 5.

In an upper part of the multifunction peripheral main body 2, the image reading portion 6 is arranged, and a platen (document presser) 24 is openably/closably provided that presses and thereby holds a document placed on a contact glass 25 (see FIG. 2) of the image reading portion 6. On the platen 24, a document conveyance device 27 is provided.

In the multifunction peripheral main body 2, a control portion (CPU) 90 is arranged that controls the operation of the image forming portion 3, the image reading portion 6, the document conveyance device 27, and the like.

Figure 2:
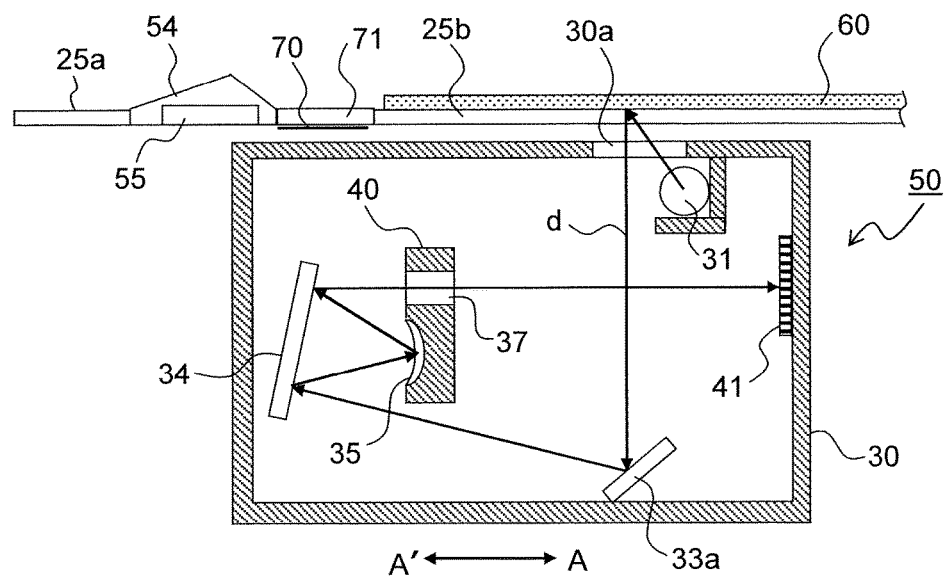
FIG. 2 is a side sectional view showing the internal structure of a reading module incorporated in an image reading portion according to one embodiment of the present disclosure.
Figure 3:
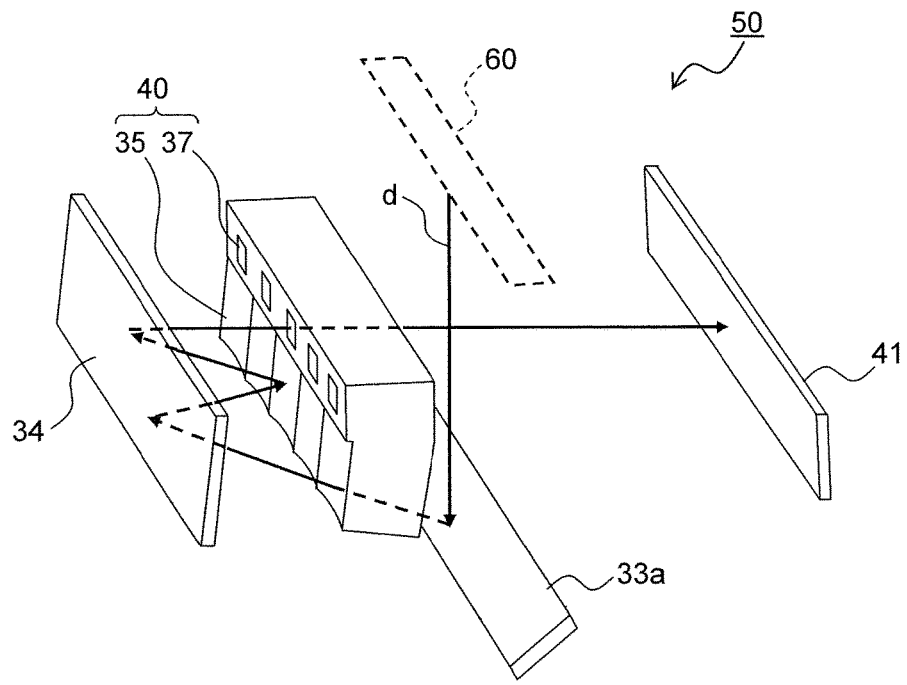
FIG. 3 is a partial perspective view showing the internal structure of the reading module incorporated in the image reading portion according to the embodiment.
Figure 4:
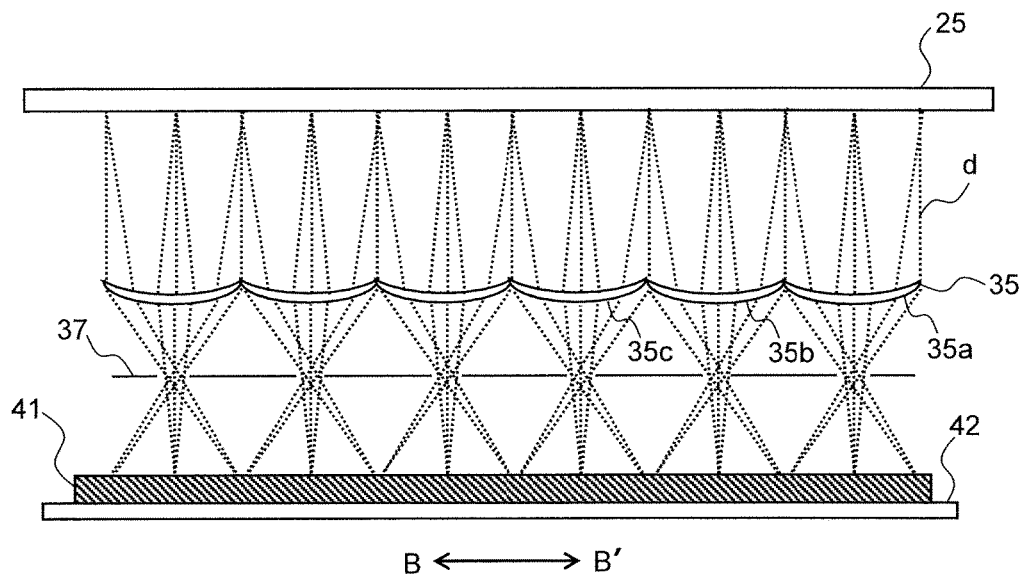
FIG. 4 is a sectional plan view showing the configuration between an optical unit and a sensor in the reading module.

FIG. 2 is a side sectional view showing the internal structure of a reading module 50 incorporated in the image reading portion 6 according to one embodiment of the present disclosure. FIG. 3 is a perspective view of the reading module 50 incorporated in the image reading portion 6 according to this embodiment, showing the optical path from a document 60 to a sensor 41. FIG. 4 is a sectional plan view showing the configuration between an optical unit 40 and the sensor 41 in the reading module 50. Although a mirror array 35 constituting the optical unit 40 shown in FIG. 4 reflects rays of light, for the sake of convenience of description, FIG. 4 shows a model where the optical unit 40 transmits rays of light.

On the top face of the image reading portion 6 is arranged the contact glass 25, which is composed of an automatic read glass 25a and a manual placement document glass 25b. The reading module 50 reads an image on the obverse side (lower side in FIG. 2) of the document 60 placed on the manual placement document glass 25b while moving in the sub-scanning direction (the direction indicated by arrows A and A'). The reading module 50 also reads an image on the obverse side of the document 60 conveyed by the document conveyance device 27 (see FIG. 1) while remaining at rest right under the automatic read glass 25a (automatic reading position).

As shown in FIG. 2, the reading module 50 includes, in a housing 30 thereof, a light source 31, a plane mirror 33a, a turning mirror 34, a mirror array 35 composed of a plurality of reflection mirrors whose reflection surfaces are aspherical surfaces, an aperture stop portion 37, and a sensor 41 as a reading means. The sensor 41 is supported on a sensor substrate 42 (see FIG. 4). As the sensor 41, a CCD or CMOS image sensor is used according to the design. The reading module 50 has a home position right under a shading plate 55 for acquiring white reference data.

With this configuration, to read a document image in a fixed-document manner, image reading proceeds as follows. First, a document 60 is placed on the contact glass 25 with the image side down. Then, while the image side of the document 60 is irradiated with light emitted from the light source 31 and transmitted through an opening 30a the reading module 50 is moved at a predetermined speed from the scanner home side to the scanner return side. As a result, the light reflected from the image side of the document 60, that is, the image light d (indicated by the solid arrows in FIG. 2), has its optical path changed by the plane mirror 33a, and is then reflected on the turning mirror 34. The reflected image light d is converged by the mirror array 35, is reflected again on the turning mirror 34, passes through the aperture stop portion 37, and is imaged on the sensor 41. The image light d of the formed image is, in the sensor 41, divided into pixels to be converted into electrical signals commensurate with the densities of individual pixels.

On the other hand, to read a document image in a sheet-through manner, image reading proceeds as follows. The reading module 50 is moved to right under the image reading region (image reading position) of the contact glass 25. Then, while the image side of a document, which is conveyed one sheet after another while being lightly pressed against the image reading region by the document conveyance device 27, is irradiated with light from the light source 31, the image light d reflected from the image side is imaged on the sensor 41 via the plane mirror 33a, the turning mirror 34, the mirror array 35, the turning mirror 34, and the aperture stop portion 37.

As shown in FIG. 3, the mirror array 35 and the aperture stop portion 37 are integrally formed of the same material and are integrated into a unit as the optical unit 40. By integrally forming the mirror array 35 and the aperture stop portion 37, it is possible to hold the position of the mirror array 35 relative to the aperture stop portion 37 with high accuracy. Thereby, it is possible to effectively prevent imaging performance from degrading as a result of the relative position varying with expansion or contraction of the mirror array 35 and the aperture stop portion 37 due to change in temperature.

The turning mirror 34 is arranged at a position facing the mirror array 35. The turning mirror 34 reflects both rays of light (the image light d) which travel from the document 60 via the plane mirror 33a to be incident on the mirror array 35 and rays of light (the image light d) which are reflected from the mirror array 35 to enter the aperture stop portion 37.

As shown in FIG. 4, the mirror array 35, which images the image light d on the sensor 41, is composed of a plurality of reflection mirrors 35a, 35b, 35c . . . , which correspond to predetermined regions of the sensor 41, coupled together in an array in the main scanning direction (the direction indicated by arrows B and B').

In the configuration according to this embodiment, the image light d reflected from reading regions Ra, Rb . . . (see FIG. 5) of the document 60 separated in the main scanning direction has its optical path changed by the plane mirror 33a and the turning mirror 34 (see FIG. 2); and is incident on the reflection mirrors 35a, 35b, 35c . . . of the mirror array 35. The image light d is reduced at predetermined reduction magnifications by the reflection mirrors 35a, 35b, 35c . . . , is reflected again on the turning mirror 34, passes through the aperture stop portion 37, and is focused on corresponding imaging regions 41a, 41b . . . of the sensor 41 to form inverted images.

The inverted images formed on the imaging regions 41a, 41b . . . are converted into digital signals, and thus magnification enlargement correction is performed through data interpolation according to the reduction magnifications for the respective imaging regions 41a, 41b . . . to reverse the data into erect images. Then, the images of the imaging regions 41a, 41b . . . are connected together to form an output image.

The aperture stop portion 37 is arranged at the focal points of the reflection mirrors 35a, 35b, and 35c . . . constituting the mirror array 35. The physical separation distance (the distance in the up/down direction in FIG. 2) between the aperture stop portion 37 and the mirror array 35 is determined according to the reduction magnification of the mirror array 35. In the reading module 50 according to this embodiment, the turning mirror 34 reflects rays of light twice, and this makes it possible to secure the optical path length from the mirror array 35 to the aperture stop portion 37, and thus to minimize the incidence/reflection angle of the image light d with respect to the mirror array 35. As a result, it is possible to suppress curvature of images formed in the imaging regions 41a, 41b . . . .

When the turning mirror 34 is divided into a plurality of mirrors, light reflected by edge parts of the mirrors acts as stray light, and strikes the mirror array 35 or enters the aperture stop portion 37. By using a single plane mirror as the turning mirror 34 as in this embodiment, the effect of stray light can be prevented even when both of the rays of light overlap each other on the turning mirror 34. Although, in this embodiment, the plane mirror 33a is used to reduce the size of the reading module 50 in its height direction, it is also possible to adopt a configuration where no plane mirror 33a is used.

In a compound-eye reading method in which the mirror array 35 is used as in this embodiment, when the imaging magnification varies with the position on a document (the optical path length between the reflection mirrors and the document) within the region corresponding to the reflection mirrors 35a, 34b, 35c . . . , when the document 60 floats off the contact glass 25, images overlap or separate from each other at a position next to border parts of the reflection mirrors 35a, 35b, 35c . . . , resulting in an abnormal image.

In this embodiment, a telecentric optical system is adopted between the document 60 and the mirror array 35. The telecentric optical system has the feature that the principal ray of the image light d that passes through the center of the aperture stop portion 37 is perpendicular to the surface of the document. This prevents the imaging magnifications of the reflection mirrors 35a, 35b, 35c . . . from varying even when the document position varies; it is thus possible to obtain a reading module 50 having a deep depth of field that does not cause image bleeding even when the document 60 is read in a form divided into fine regions. To achieve that, the principal ray needs to remain perpendicular to the surface of the document irrespective of the document position, and this requires a mirror array 35 whose size in the main scanning direction is equal to or larger than the size of the document.

In the compound-eye reading method in which the mirror array 35 is used as described above, when the image light d reflected from the reflection mirrors 35a, 35b, 35c . . . and transmitted through the aperture stop portion 37 is imaged in a predetermined region on the sensor 41, the image light d traveling from outside the reading region, may, as stray light, strike a region next to the predetermined region on the sensor 41.

Figure 5:
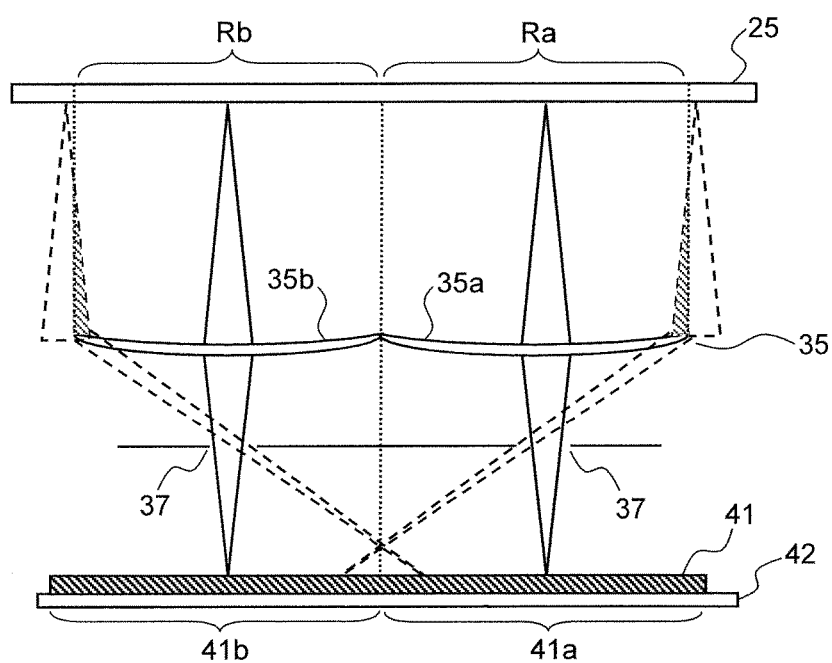
FIG. 5 is a partly enlarged view showing the optical path between the reflection mirrors and the sensor in FIG. 4.

FIG. 5 is a partly enlarged view showing the optical path between the reflection mirrors 35a and 35b and the sensor 41 in FIG. 4. As shown in FIG. 5, the light from the reading regions Ra and Rb corresponding to the reflection mirrors 35a and 35b is imaged in the corresponding imaging regions 41a and 41b on the sensor 41. Here, the rays of light (indicated by hatched regions in FIG. 5) inward of the principal ray, even though they belong to the light traveling from outside the reading regions Ra and Rb, are imaged on the sensor 41 by the reflection mirrors 35a and 35b. Specifically, the light reflected from the reflection mirror 35a strikes the adjacent imaging region 41b, and the light reflected from the reflection mirror 35b strikes the adjacent imaging region 41a. These parts of the image light, even though feeble, form inverted images corresponding to different reading regions, and thus, if superimposed on proper images which are supposed to be formed in the imaging regions 41a and 41b, produce abnormal images.

Figure 6:
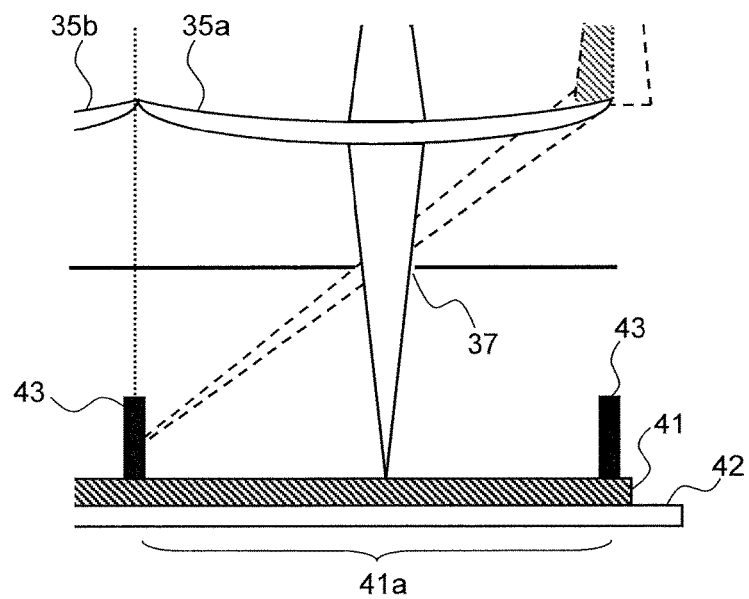
FIG. 6 is a partly enlarged view showing the optical path between the reflection mirrors and an imaging region on the sensor, showing a configuration where light shielding walls are provided at the boundaries of the imaging region.

Thus, in this embodiment, the imaging magnifications of the reflection mirrors 35a, 35b, 35c . . . of the mirror array 35 are set to be reduction magnifications, and as shown in FIG. 6, light shielding walls 43 are formed to protrude from the boundaries between the imaging regions 41a and 41b of the sensor 41 in the direction of the aperture stop portion 37.

Here, as shown in FIG. 6, for example, of the image light d which is to be imaged in the imaging region 41a on the sensor 41, the light traveling from outside the reading region Ra is shielded by the light shielding wall 43; it is thus possible to prevent the stray light from striking the imaging region 41b arranged next to the imaging region 41a in the main scanning direction. Here, assuming that the reflection mirrors 35a, 35b, 35c . . . are set at a unity magnification, the reflection mirrors 35a, 35b, 35c . . . use the entire area over the image forming regions 41a, 41b . . . up to their boundaries to form images of the image light d. As a result, no space can be secured for forming the light shielding walls 43 at the boundaries of the imaging regions 41a, 41b . . . . To secure the space for forming the light shielding walls 43, it is necessary to set the imaging magnifications of the reflection mirrors 35a, 35b, 35c . . . to be reduction magnifications as described above.

The optical unit 40 that includes the mirror array 35 and the aperture stop portion 37 preferably is, with consideration given to the cost, formed of resin by injection molding. Accordingly, it is necessary to determine the reduction magnifications with a predetermined margin, with consideration given to expansion or contraction due to change in temperature around the reading module 50 (hereinafter, referred to as the ambient temperature). However, reducing the reduction magnifications of the reflection mirrors 35a, 35b, 35c . . . necessitates, when a sensor 41 with cell sizes (imaging regions) corresponding to the magnifications is used, a higher resolution on the sensor 41, and even when a sensor 41 with cell sizes for use in unity magnification optical systems is used, a lower resolution results. Thus, it is preferable to maximize the reduction magnifications.

Figure 7:
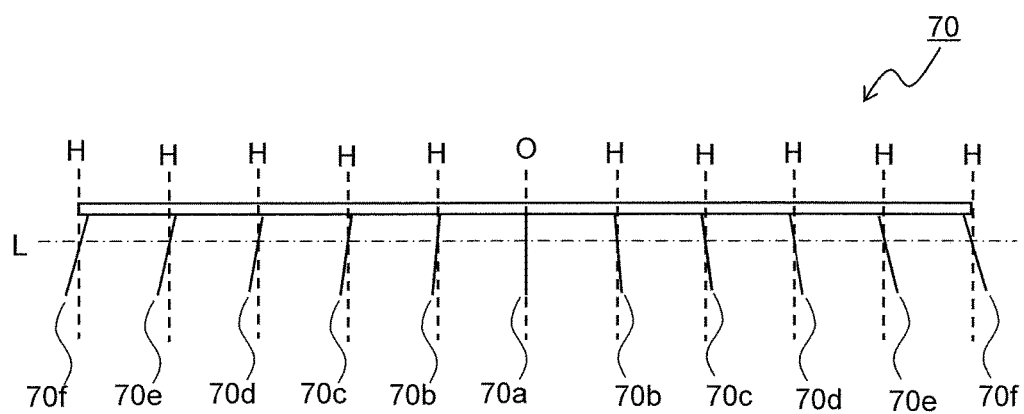
FIG. 7 is a plan view of a reference drawing pattern used in an image reading portion according to a first embodiment of the present disclosure.

FIG. 7 is a plan view of a reference drawing pattern 70 used in the image reading portion 6 according to a first embodiment of the present disclosure. The reference drawing pattern 70 is used to determine positions at which the images imaged in the imaging regions 41a, 41b . . . are connected together, and is, as shown in FIG. 2, stuck to the bottom surface of a reference plate 71 arranged near the boundary between the automatic read glass 25a and the manual placement document glass 25b in the image reading portion 6. In FIG. 7, the broken lines in the vertical direction represent boundary lines H between the reflection mirrors 35a, 35b, 35c . . . , and the solid lines arranged to overlap the broken lines represent pixel cut lines 70a to 70f constituting the reference drawing pattern 70. The dash-dot line L in the horizontal direction represents a read line of the reference drawing pattern 70.

Out of the pixel cut lines 70a to 70f, the pixel cut line 70a which overlaps the fixed position O of the optical unit 40 is arranged vertically to completely overlap the boundary lines H between the reflection mirrors 35a, 35b, 35c . . . , and the pixel cut lines 70b to 70f are arranged such that their inclinations relative to the boundary lines H between the reflection mirrors 35a, 35b, 35c . . . (their distances from the boundary lines H in the main scanning direction) increase the farther away from the fixed position O in the non-fixed direction (the left/right direction in FIG. 7).

Now, a description will be given of how image data is cut out and connected together by use of the reference drawing pattern 70 in FIG. 7. It is assumed that the optical unit 40 including the mirror array 35 and the aperture stop portion 37 is formed of a resin material, and is fixed on the housing 30 at one point (the fixed position O) in the main scanning direction. The expansion and contraction of the resin material are dominated by the linear expansion coefficient, and are proportional to change in temperature. Let the linear expansion coefficient of the resin material be 6 ($\times 10^{-5}$/k), and let the variation in temperature relative to normal temperature (25° C.) be $\Delta t$ (° C.); then the amount of expansion z at a position the distance x (mm) away from the fixed position is expressed by $$z = x \times \Delta t \times 6 \times 10^{-5} \text{ (mm)} \qquad (1)$$

Although the temperature of a place where the image forming apparatus 100 is installed is usually from 10° C. to 32.5° C., the inside of the image forming apparatus 100 is heated by radiant heat from the fixing portion 14, and thus the ambient temperature is expected to be approximately from 10° C. to 60° C. Here, suppose the fixed position O of the optical unit 40 is at the center of the reading width (300 mm) of a document of A3 size. Then opposite end parts are located at x=150 mm. When the ambient temperature is 10° C., formula (1) gives z1=150×(10×25)×6×10$^{-5}$=−0.135 (mm), and thus contraction occurs from the normal temperature position toward the fixed position by 0.135 mm. When the ambient temperature is 60° C., formula (1) gives z2=150×(60−25)×6×10$^{-5}$=0.315 (mm), and thus expansion occurs from the normal temperature position toward the non-fixed positions (opposite end parts) by 0.315 mm.

Now, consider the middle positions between the fixed position O and the opposite end parts. The middle positions are located at x=75 mm. When the ambient temperature is 10° C., formula (1) gives z3=75×(10−25)×6×10$^{-5}$=−0.0675 (mm), and thus construction occurs from the normal temperature position toward the fixed position by 0.0675 mm. When the ambient temperature is 60° C., formula (1) gives z4=75×(60−25)×6×10$^{-5}$=0.1575 (mm), and thus expansion occurs from the normal temperature position toward the non-fixed positions (opposite end parts) by 0.1575 mm.

Thus, as the optical unit 40 contracts or expands, the positions of the boundaries between the reflection mirrors 35a, 35b, 35c . . . vary by the same distance. Accordingly, the reference drawing pattern 70 is configured to have a positional relationship similar to the amounts of movement of the positions of the boundaries between the reflection mirrors 35a, 35b, 35c . . . resulting from the above-mentioned change in temperature, and thereby the reading position used for correction of the position at which imaged pixels are cut out is varied according to the ambient temperature. Specifically, the reference drawing pattern 70 stuck to the reference plate 71 (see FIG. 2) is read at a predetermined position (read line) corresponding to the ambient temperature in the sub-scanning direction, and thereby the imaged-pixel cut-out position is corrected.

Figure 8:
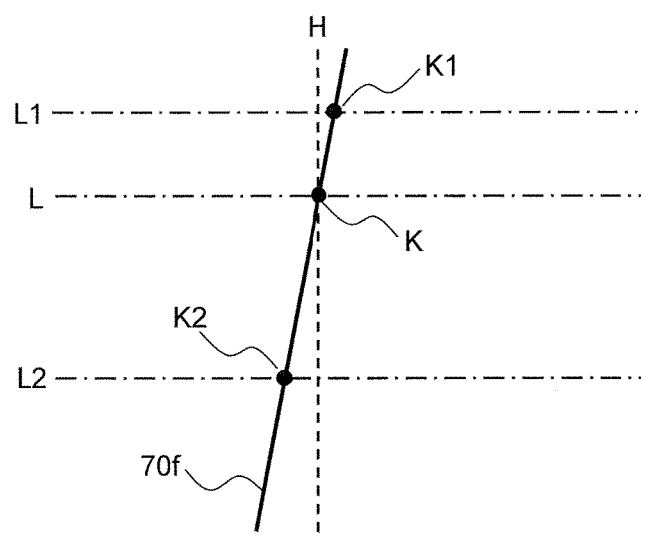
FIG. 8 is a partly enlarged view of a pixel cut line constituting the reference drawing pattern shown in FIG. 7.

FIG. 8 is a partly enlarged view of the pixel cut line 70*f* constituting the reference drawing pattern 70 shown in FIG. 7. When the ambient temperature is normal temperature (25° C.), no deviation occurs in the imaged-pixel cut-out position due to change in temperature, and thus pixels can be cut out at the intersection K of the boundary line H between the reflection mirrors with the pixel cut line 70*f*. That is, the read line L is configured to pass through the intersection K.

When the ambient temperature is lower than normal temperature, the optical unit 40 contracts toward the fixed position O, and thus the imaged-pixel cut-out position moves also toward the fixed position O. Accordingly, the read line L is set at L1 so as to pass through point K1 deviated from the intersection K toward the fixed position O. When the ambient temperature is higher than normal temperature, the optical unit 40 expands toward the non-fixed positions (opposite end parts), and thus the imaged-pixel cut-out position moves also toward the non-fixed positions. Accordingly, the read line L is set at L2 so as to pass through point K2 deviated from the intersection K toward the opposite end parts. The same applies to other pixel cut lines 70*b* to 70*e*.

With the above-described method, by moving the reading position (read line L) of the reference drawing pattern 70 in the sub-scanning direction (in the up/down direction in FIG. 8) with consideration given to the expansion and contraction of the optical unit 40 resulting from change in temperature, it is possible to cut out images imaged in the imaging regions 41*a*, 41*b* . . . within a proper range with consideration given to the ranges of movement of the reflection mirrors 35*a*, 35*b*, 35*c* . . . in response to change in temperature relative to normal temperature (25° C.). Thus, there is no need to reduce the reduction magnifications of the reflection mirrors 35*a*, 35*b* . . . , and thus high-resolution reading can be achieved.

In FIG. 8, the pixel cut line 70*f* is so formed as to be longer on the lower side (expansion side) than on the upper side (contraction side) of the intersection K of the boundary line H with the pixel read line 70*f*. This is because the amount of expansion and contraction of the optical unit 40 is, relative to normal temperature, larger on the temperature increasing side (60° C.) than on the temperature decreasing side (10° C.), and so is the resulting deviation in the imaging position from the boundary between the reflection mirrors 35*a*, 35*b*, 35*c* . . . .

Figure 9:
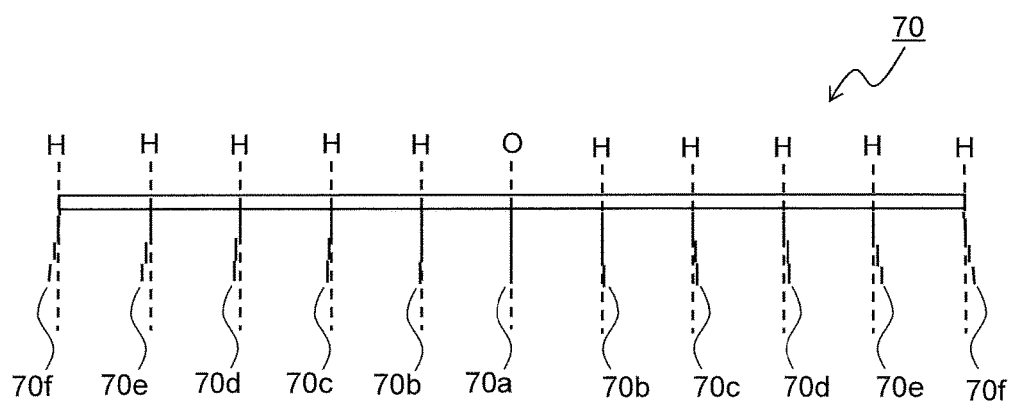
FIG. 9 is a plan view of a reference drawing pattern used in an image reading portion according to a second embodiment of the present disclosure.

FIG. 9 is a plan view of a reference drawing pattern 70 used in an image reading portion 6 according to a second embodiment of the present disclosure. In this embodiment, out of the pixel cut lines 70*a* to 70*f* (indicated by the solid lines in FIG. 9) constituting the reference drawing pattern 70, the pixel cut line 70*a* which overlaps the fixed position O of the optical unit 40 is a single straight line which completely overlaps the boundary lines H between the reflection mirrors 35*a*, 35*b*, 35*c* . . . (indicated by the broken lines in the vertical direction in FIG. 9).

The pixel cut lines 70*b* to 70*f* are formed such that a plurality of straight-line segments parallel to the boundary lines H between the reflection mirrors 35*a*, 35*b*, 35*c* . . . are successively arranged stepwise in the sub-scanning direction (the up/down direction in FIG. 9). The pixel cut lines 70*b* to 70*f* are arranged such that their distances from the boundary lines H between the reflection mirrors 35*a*, 35*b*, 35*c* . . . in the main scanning direction increase the farther away from the fixed position O in the non-fixed direction (the left/right direction in FIG. 9). In other words, when the plurality of successive straight-line segments arranged stepwise as a whole are seen as the respective pixel cut lines 70*b* to 70*f*, the inclinations relative to the boundary lines H between the reflection mirrors 35*a*, 35*b*, 35*c* . . . increase the farther away from the fixed position O in the non-fixed direction (the left/right direction in FIG. 9). The dash-dot line L in the horizontal direction represents a read line of the reference drawing pattern 70.

Figure 10:
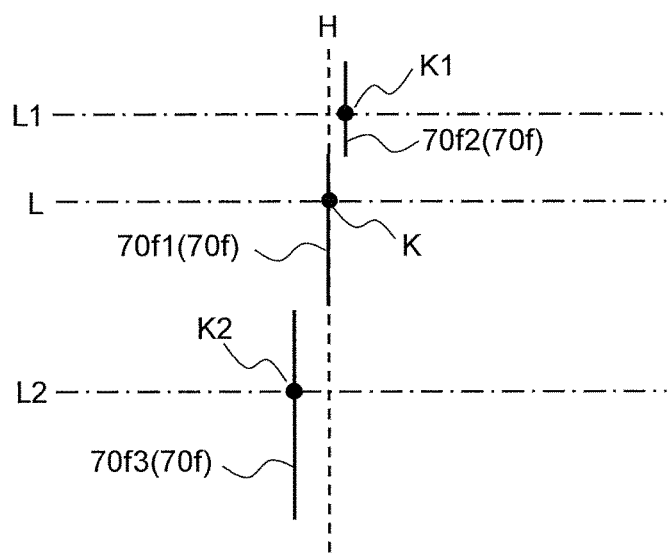
FIG. 10 is a partly enlarged view of a pixel cut line constituting the reference drawing pattern shown in FIG. 9.

FIG. 10 is a partly enlarged view of the pixel cut line 70*f* constituting the reference drawing pattern 70 shown in FIG. 9. When the ambient temperature is normal temperature (25° C.), no deviation occurs in the imaged-pixel cut-out position due to change in temperature, and thus pixels can be cut out at point K on a first segment 70*f*1 of the pixel cut line 70*f* which overlaps the boundary line H between the reflection mirrors. That is, the read line L is configured to pass through the first segment 70*f*1.

When the ambient temperature is lower than normal temperature, the optical unit 40 contracts toward the fixed position O, and thus the imaged-pixel cut-out position moves also toward the fixed position O. Accordingly, the read line L is set at L1 so as to pass through a second segment 70*f*2 deviated from the first segment 70*f*1 toward the fixed position O, and thus pixels can be cut out at the intersection K1 of the read line L1 with the second segment 70*f*2. When the ambient temperature is higher than normal temperature, the optical unit 40 expands toward the non-fixed positions (opposite end parts), and thus the imaged-pixel cut-out position moves also toward the non-fixed positions. Accordingly, the read line L is set at L2 so as to pass through a third segment 70*f*3 deviated from the first segment 70*f*1 toward the opposite end parts, and thus pixels can be cut out at the intersection K2 of the read line L2 with the third segment 70*f*3. The same applies to other pixel cut lines 70*b* to 70*e*.

In this embodiment, by use of the stepwise reference drawing pattern 70, the distance between the intersection K1 and the boundary line H does not vary even when the position of the read line L is changed according to the ambient temperature as long as the read line L crosses the same segment (for example, the second segment 70*f*2) of the pixel cut line 70*f*. Thus, the pixel cut-out position does not linearly vary as the ambient temperature changes, and this leads to low correction accuracy.

On the other hand, the same segment (for example, the second segment 70*f*2) of the pixel cut line 70*f* is continuous in the moving direction of the read line L (in the sub-scanning direction), and thus it is possible to determine the pixel cut-out position by averaging the data read while the read line L is moved to different positions on the second segment 70*f*2. Thus, even when the reference plate 71, which is the background of the reference drawing pattern 70, has a black dot or the like, it is possible to reduce its effect and thereby to perform stable correction.

Figure 11:
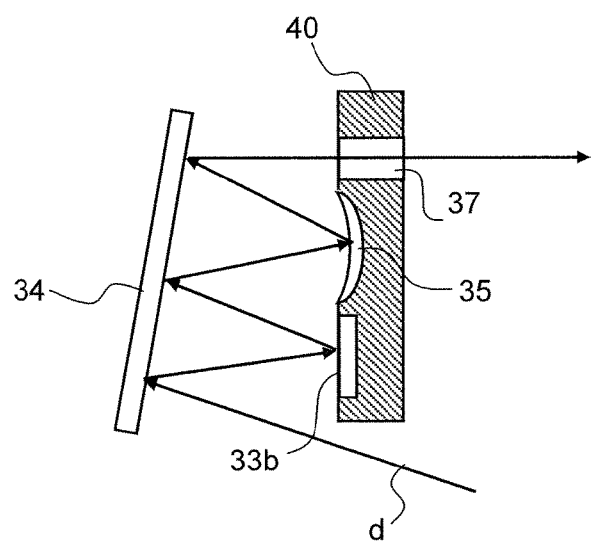
FIG. 11 is a partial sectional view showing a modified example of a reading module used in the image reading portion according to the embodiment, showing a configuration where image light is reflected three times on a turning mirror.

The embodiments described above are in no way meant to limit the present disclosure, which thus allows for many modifications and variations within the spirit of the present disclosure. For example, although in the above-described embodiments, image light d which travels from the document 60 via the plane mirror 33*a* to strike the mirror array 35 and image light d which is reflected from the mirror array 35 to enter the aperture stop portion 37 are each reflected on the turning mirror 34 once, that is, reflection on it takes place twice in total, as shown in FIG. 11, with a plane mirror 33*b* arranged on the optical unit 40 side, image light d may be reflected on the turning mirror 34 three times or more.

Although, in the above-described embodiments, the fixed position O of the optical unit 40 is at the center in the main scanning direction (the document width direction), the fixed position of the optical unit 40 may be at any point in the main scanning direction (the document width direction). For example, in the first embodiment, when the fixed position of the optical unit 40 is at one end in the main scanning direction, the reference drawing pattern 70 may be configured such that the inclinations of the pixel cut lines 70*a* to 70*f* relative to the boundary lines H increase the closer they are to the other end (non-fixed end) in the main scanning direction.

Although the above-described embodiments deal with, as an example of an image reading device, the image reading portion 6 incorporated in the image forming apparatus 100, the present disclosure is applicable equally to an image scanner used separately from the image forming apparatus 100.

The present disclosure is applicable to image reading devices provided with a reading module adopting a reading configuration where image light is imaged on a sensor by use of a mirror array in which reflection mirrors are arranged in an array. Based on the present disclosure, it is possible to provide an image reading device that can cut out images within a proper range according to ambient temperature and connect the images together, and to provide an image forming apparatus provided with such an image reading device.

What is claimed is:

1. An image reading device comprising:
   a reading module comprising:
      a light source which radiates light to a document;
      an optical system which images, as image light, reflected light of the light radiated from the light source to the document;
      a sensor in which a plurality of imaging regions for converting the image light imaged by the optical system into an electrical signal are arranged next to each other in a main scanning direction; and
      a housing in which the light source, the optical system, and the sensor are housed; and
   a reference drawing pattern which determines connection positions between the imaging regions at which to connect together images imaged in the imaging regions, wherein
   the optical system includes:
      a mirror array in which a plurality of reflection mirrors whose reflection surfaces are aspherical concave surfaces are coupled together in an array in the main scanning direction; and
      a plurality of aperture stop portions each arranged in an optical path of image light between a reflection mirror and an imaging region of the sensor, the plurality of aperture stop portions each adjusting an amount of image light reflected from the reflection mirror,
   the reference drawing pattern is composed of a plurality of pixel cut lines arranged to correspond to boundary lines between the reflection mirrors,
   the optical system is fixed on the housing at one point in the main scanning direction, and
   the pixel cut lines are arranged such that distances thereof from the boundary lines in the main scanning direction increase the farther away from a fixed position of the optical system in the main scanning direction.

2. The image reading device of claim 1, wherein
the pixel cut lines are straight lines inclined at predetermined angles with respect to the boundary lines.

3. The image reading device of claim 1, wherein
the pixel cut lines are formed such that a plurality of straight-line segments parallel to the boundary lines are successively arranged stepwise in a sub-scanning direction.

4. The image reading device of claim 1, wherein
in the reading module, an optical path of image light traveling toward each reflection mirror and an optical path of image light traveling toward an aperture stop portion run in a same direction, and a turning mirror is arranged that bends image light reflected from the reflection mirror toward the aperture stop portion, and
the turning mirror bends the image light twice or more times on a same reflection surface thereof, including bending the image light traveling toward the reflection mirror and bending the image light reflected from the reflection mirror toward the aperture stop portion.

5. The image reading device of claim 4, wherein
the mirror array and the aperture stop portions are integrally formed.

6. The image reading device of claim 1, wherein
the optical system is a telecentric optical system where image light is parallel to an optical axis on a document side of the mirror array, and forms an inverted image on the sensor.

7. The image reading device of claim 6, wherein
imaging magnifications of the reflection mirrors for the respective imaging regions are set at reduction magnifications, and
a light shielding wall is provided which is formed to protrude from a boundary between adjacent imaging regions toward the aperture stop portions, the light shielding wall shielding stray light which is to be incident on the imaging regions.

8. The image reading device of claim 7, wherein
in the reading module, image data read in the imaging regions of the sensor undergoes magnification enlargement correction through data interpolation according to the reduction magnifications to reverse the data into erect images, and then the images in the imaging regions are connected together to form an output image.

9. An image forming apparatus comprising the image reading device of claim 1.

* * * * *